(12) United States Patent
Rohm et al.

(10) Patent No.: US 6,253,164 B1
(45) Date of Patent: *Jun. 26, 2001

(54) CURVES AND SURFACES MODELING BASED ON A CLOUD OF POINTS

(75) Inventors: Nikki Ruth Rohm, Bellevue; Richard Everett Rice, Seattle, both of WA (US)

(73) Assignee: Silicon Graphics, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,114

(22) Filed: Dec. 24, 1997

(51) Int. Cl.[7] .............................. G06F 7/60; G06F 17/10; G06F 101/00; G06G 7/48
(52) U.S. Cl. .................................................. 703/2; 703/6
(58) Field of Search ..................... 364/578; 395/500.23, 395/500.27; 703/2, 6

(56) References Cited

U.S. PATENT DOCUMENTS

| | | | |
|---|---|---|---|
| H1530 | * 5/1996 | Lee ...................................... | 356/237.2 |
| 4,825,263 | * 4/1989 | Desjardins et al. .................... | 356/376 |
| 4,879,652 | * 11/1989 | Nowak ...................................... | 378/4 |
| 5,005,147 | * 4/1991 | Krishen et al. .................... | 395/500.34 |
| 5,237,649 | * 8/1993 | Yamada .................................. | 345/442 |
| 5,257,346 | * 10/1993 | Hanson .................................. | 345/425 |
| 5,471,995 | * 12/1995 | Halliday .............................. | 600/594 |
| 5,531,520 | * 7/1996 | Grimson et al. ..................... | 382/131 |
| 5,542,032 | * 7/1996 | Pritt ...................................... | 345/421 |
| 5,729,451 | * 3/1998 | Gibbs et al. .......................... | 702/12 |
| 5,954,650 | * 9/1999 | Saito et al. ............................ | 600/425 |
| 5,961,454 | * 10/1999 | Kooy et al. ........................... | 600/407 |
| 6,006,126 | * 12/1999 | Cosman ................................ | 600/426 |

OTHER PUBLICATIONS

Quick Guide Tutorial, "Even If You Don't Read Anything Else, Read This," downloaded from www, 1997, pp. 1–10.
Portable Design, "Model complex objects from photos," p. 63, 1997.
Silicon Graphics, Co., "Studio V8, Your Design Advantage," Brochure, 1996.

* cited by examiner

Primary Examiner—Kevin J. Teska
Assistant Examiner—Hugh Jones
(74) Attorney, Agent, or Firm—Staas & Halsey LLP

(57) ABSTRACT

A method of computer curve and surface modeling includes storing in a computer memory a cloud of points associated with an object and least-square fitting one or more curves or surfaces to the cloud of points. The resulting curves or surfaces representative of the object are easier to describe mathematically and require less computer resources to process.

30 Claims, 10 Drawing Sheets

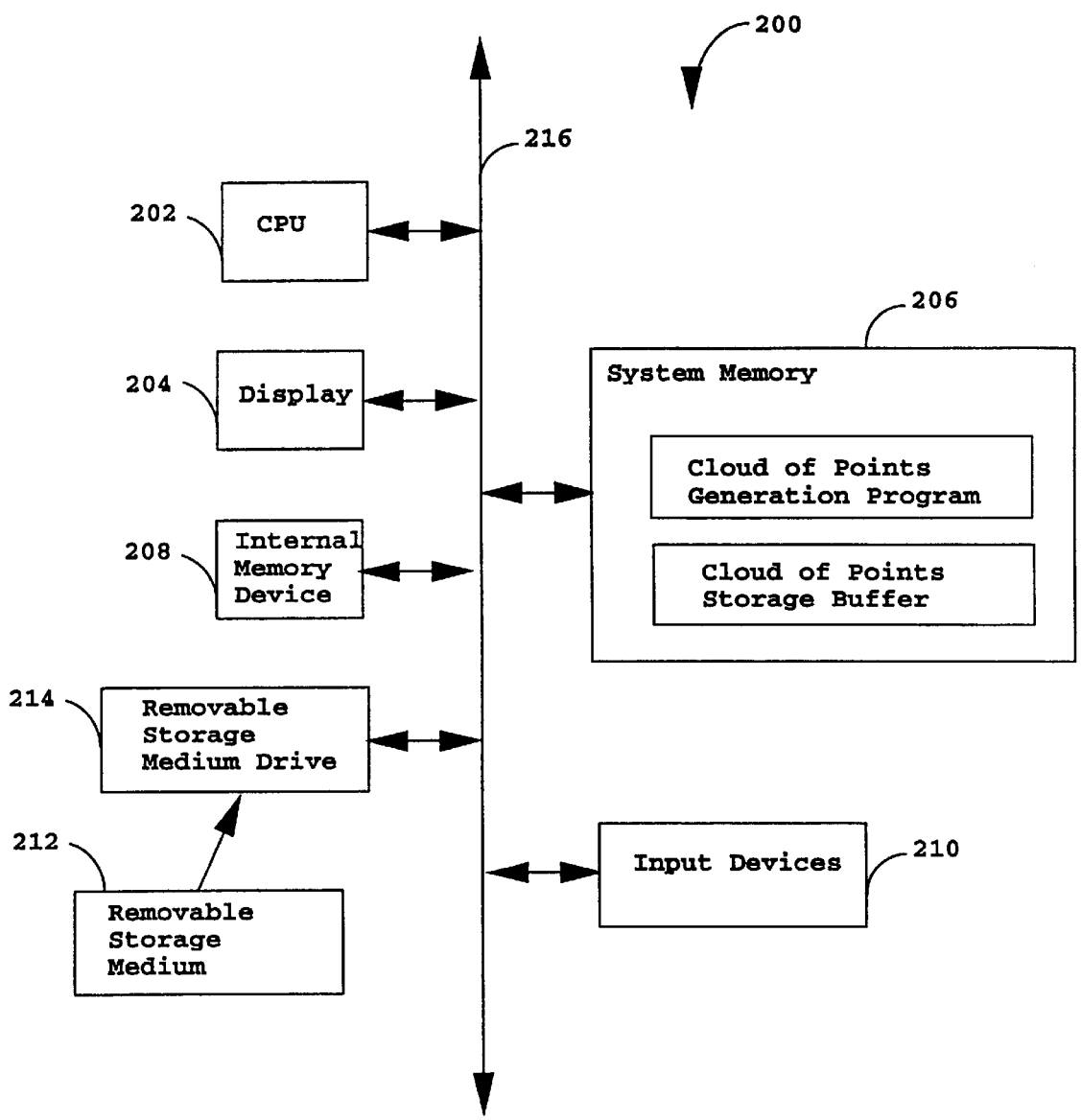

CURVES AND SURFACES MODELING BASED ON A CLOUD OF POINTS

REFERENCE TO APPENDIX

This application includes a section of a user manual for Alias|Wavefront Studio™ Version 8.5 entitled "NURBS Modeling in Alias". The copyright owner has no objection to paper reproduction of the appendix as it appears in this patent document, or in the official files of the U.S. Patent & Trademark Office, but grants no other license and reserves all other rights whatsoever. The entire appendix is hereby incorporated by reference.

BACKGROUND

This invention relates to computer modeling, and in particular, to the creation of geometric models from digitized data.

Advances in computer technology have made possible realistic and accurate three-dimensional (3D) computer models of real-world objects. Such capability provides a way to prototype and test new designs quickly and cost-effectively. One method of creating these 3D models is to generate them using software which creates polygon meshes or mathematical representations of objects. Users of 3D computer modeling technology, however, are increasingly finding that some objects are easier to build as physical parts, for example using a traditional sculpting process, rather than through software-based 3D modeling techniques. To complete the overall modeling process, a computer representation of these physical models is needed. This can be accomplished, among other ways, through the use of scanning technology.

With recent advances in scanning technology, the use of digitized data is becoming an important part of the geometry creation process for designers and animators. Physical models can be scanned using a scanning system, producing a database of 3D points which can then be processed in software to produce curves and surfaces representative of the physical objects. A typical scanning process results in several scans of an object, producing several thousand to several million 3D points. These scanning devices may generate dimensional data using contact as well as non-contact techniques. For instance, the surface of an object may be traced by a tracer disk, a stylus or a touch probe scanner. Alternatively, an optical beam such as a laser beam may be irradiated on the exterior contours of the object and imaged onto a position detector. Using these various techniques, the 3D shape measuring device can generate a complete spatial description of the object as a cloud, or set, of points.

However, since computers have finite storage and processing capacity, it is undesirable to model an object with an infinite number of coordinate points. Moreover, these points may not be edited or manipulated easily by tools which expect the object to be represented mathematically by curves or surfaces.

SUMMARY

The invention provides a computer-implemented method of curve and surface modeling. The method stores in a computer memory a cloud of points associated with an object and least-square fits one or more curves or surfaces to the cloud of points. The resulting curves or surfaces representative of the object are easier to describe mathematically and require less computer resources to process.

In one aspect, each curve which is to be projected onto the point cloud associated with the object is fitted to the point cloud using various curve fit methods and parameters selected by the user. The curve fit method may be based on spans between selected points on the object, or may be based on a predetermined tolerance range. The parameters may be interactively altered, and the curve fitting process may be iteratively performed by the user until the fit is optimal.

In another aspect, the surfaces representative of the object may be fitted. A number of surface fit methodologies may be applied, including a gridded fit method and a detailed fit method, to arrive at a projected curve which more closely represents the object. The projected curve is fit to the cloud of points in accordance with user-specified criteria. Additionally, a user may modify the specified criteria iteratively to provide a better fit of the curves and surfaces to the cloud of points.

In another aspect, an interface is provided for use with a computer-based system for curve and surface modeling of a target. The interface enables a user to alter one or more parameters interactively. The interface also allows an automatic refitting of the curves or surfaces to the cloud of points in response to user-specified parameters.

Advantages of the invention may include one or more of the following. A cloud of points can be converted into segments such as planes, lines, and other object "primitives." As a result, the object surfaces are easier to describe mathematically and require less computer resources to process. A computer modeler need not individually model each surface and assemble the surface into a completed object. Rather, the modeler is required only to capture spatial information and the system will generate all surfaces automatically.

Other features and advantages will become apparent from the following description and from the claims.

BRIEF DESCRIPTION OF THE DRAWINGS

FIG. 10 is a schematic illustration of a computer for supporting the processes of FIGS. 1–9.

DESCRIPTION

Figure 1:
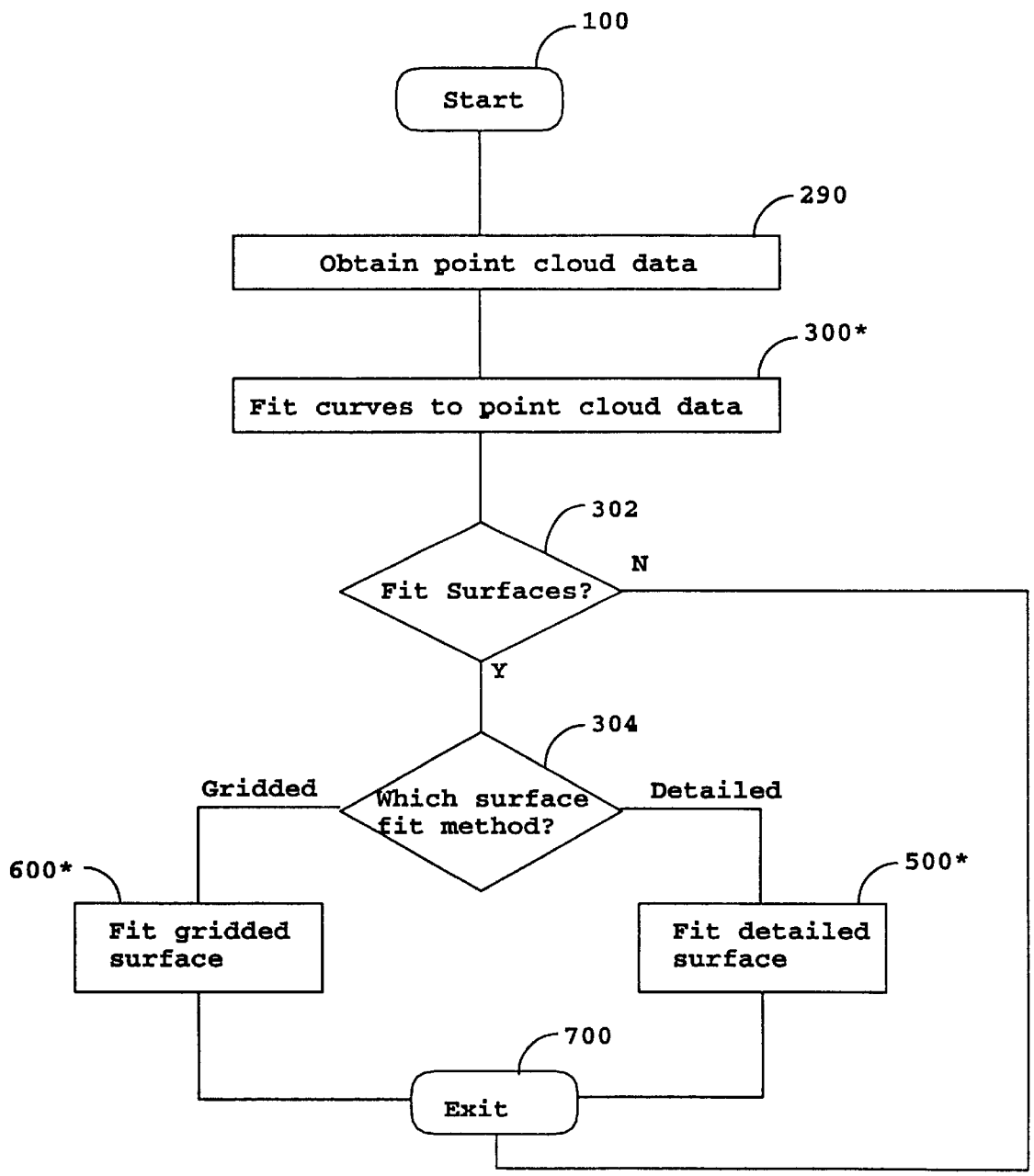
FIG. 1 is a flowchart illustrating a process for fitting curves and surfaces to a cloud of points.

Referring now to FIG. 1, a process 100 for fitting curves and surfaces to a cloud of points associated with an object is shown. In the process 100, point cloud data associated with the object is retrieved in step 290. The point cloud data may be generated by a suitable 3D shape measuring device, as discussed above. Next, curves are fit to the point cloud data in step 300, as illustrated in more detail in FIG. 2. In step 300, each curve which is to be projected onto the point cloud associated with the object is fitted to the point cloud using various curve fit methods and parameters selected by the user. The curve fit method may be based on the number of spans or arches associated with the object, or may be based on a predetermined tolerance range. The parameters may be interactively altered, and the curve fitting process may be iteratively performed by the user until the fit is optimal.

Next, in step 302, the process 100 determines whether surfaces are to be fit to the point cloud data. If not, process 100 exits in step 700. Alternatively, if the user specifies that one or more surfaces are to be fit to the object, the process 100 proceeds from step 302 to step 304 to allow the user to specify the fit methodology to be applied. If the surfaces are to be fit using a gridded method, the process 100 proceeds to step 600 where it generates a sampling grid and refines the sampling grid in creating a gridded surface. The processing as well as mathematical details of step 600 are shown in more detail in FIG. 7. Alternatively, if the surfaces are to be fit using a detailed method, the process 100 proceeds to step 500 where it projects boundary curves onto the point cloud and fits the curve to predetermined boundary curves and sample points. The processing as well as mathematical details of step 500 are shown in more detail in FIG. 8. After completing step 600 or 500, the process 100 exits in step 700.

Figure 2:
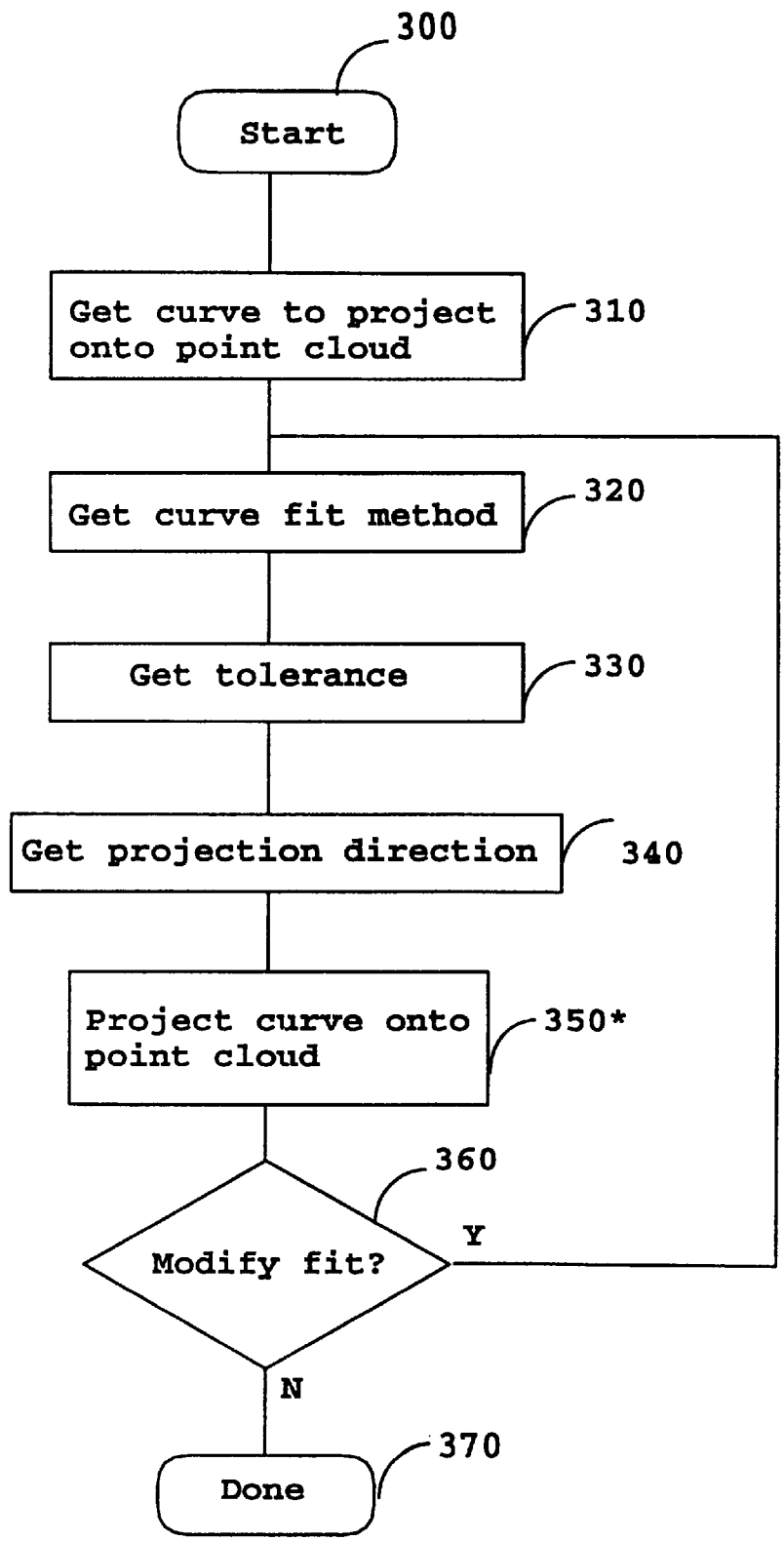
FIG. 2 is a flowchart illustrating a process for fitting curves to a cloud of points.

FIG. 2 illustrates step 300 of FIG. 1 in more detail. Upon entry to the process 300, a curve which is to be projected onto the point cloud associated with the object is selected by the user in step 310. Next, a curve fit method is chosen by the user in step 320. A tolerance range of the curve fit method is specified by the user in step 330. Further, a projection direction is indicated by the user in step 340. Next, the curve is projected onto the point cloud in step 350. The projection process is shown in more detail in FIG. 3. From step 350, a user determines whether the specified fitting parameters need to be modified in step 360. If so, the process of FIG. 2 loops back to step 320 to repeat the fitting process. Alternatively, the process 300 exits in step 370.

Figure 3:
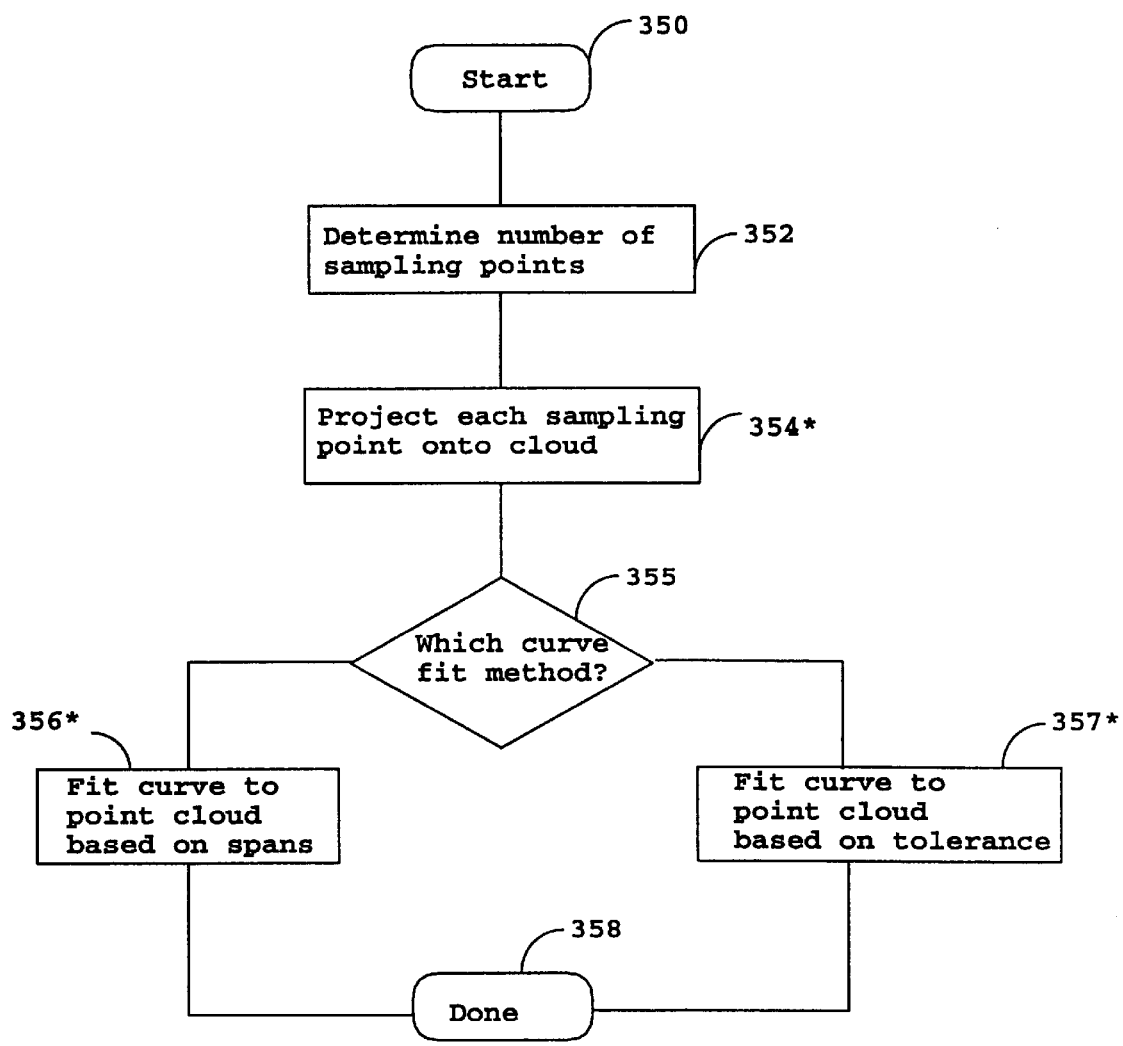
FIG. 3 is a flowchart illustrating a process for projecting a curve onto a cloud of points.

Turning now to FIG. 3, the process 350 of FIG. 2 is illustrated in more detail. First, the process 350 determines a number of sampling points in step 352. The number of sampling points may be a user specified value, or alternatively, a computed value. Next, the process 350 projects each sampling point onto the cloud in step 354, as shown in more detail in FIG. 4. From step 354, the process 350 determines a curve fit method to be applied in step 355. If the curve fit method is based on spans or spreads from one support point to another support point of the object being modeled, the process 350 moves from step 355 to step 356 to fit the curve to the point cloud based on span parameters. Alternatively, if the curve fit method is based on tolerance, the process 350 moves to step 357 to fit the curve to the point cloud with the restriction that the fitted curve resides within the deviation range specified by the user. From either step 356 or step 357, the process of FIG. 3 exits in step 358.

Figure 4:
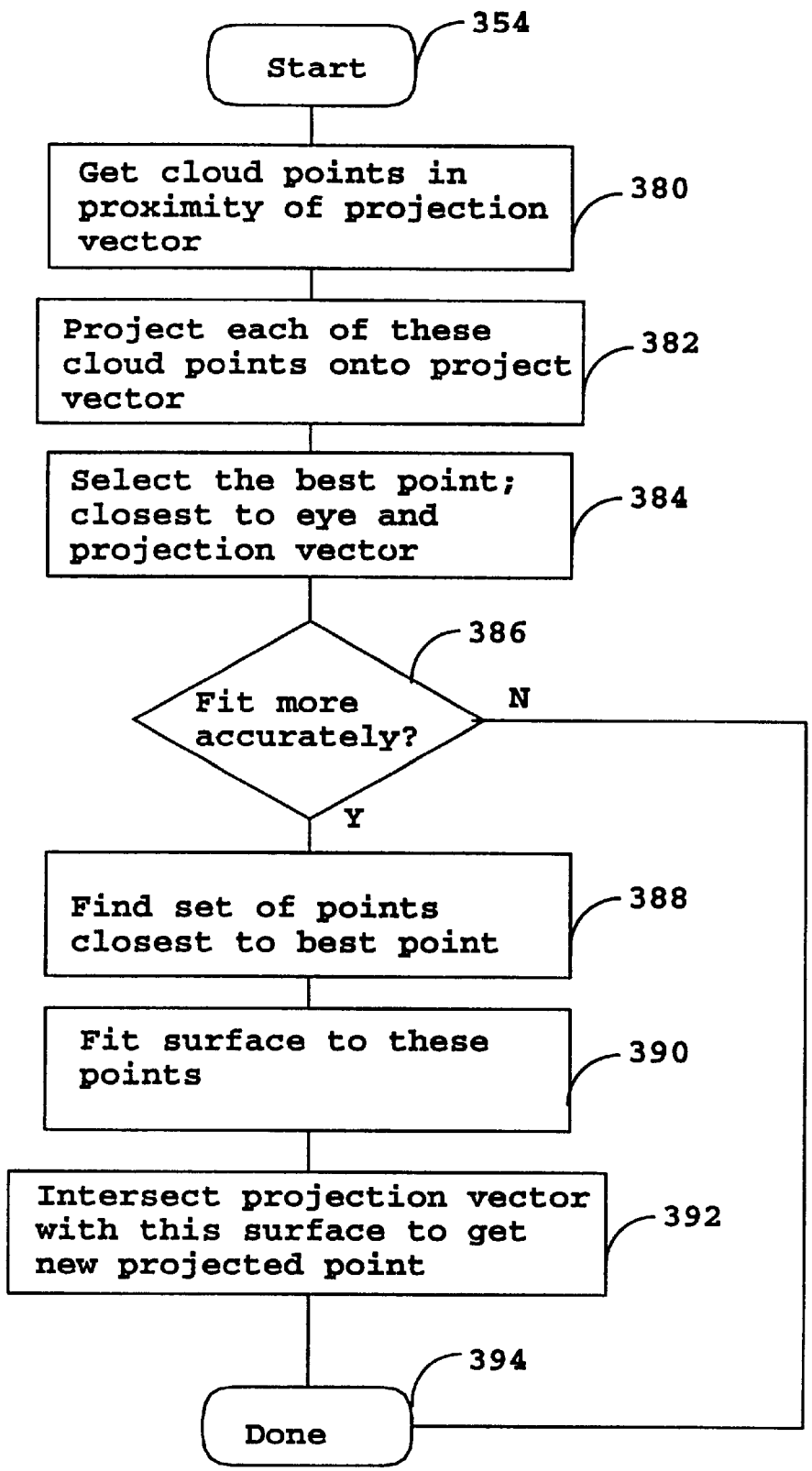
FIG. 4 is a flowchart illustrating a process for projecting sampling points onto a clouds of points.

Turning now to FIG. 4, a process associated with step 354 of FIG. 3 is illustrated in more detail. In step 354, each sampling point is projected onto the cloud. Thus, the process 354 obtains a cloud point in a proximity of a projection vector in step 380. Next, the process 354 projects each of these cloud points onto the projection vector in step 382. The best point is selected, based on parameters such as its proximity to the eye and to the projection vector in step 384. Next, the process 354 determines whether the fit is to be performed more accurately in step 386. If not, the process 354 exits in step 394. Alternatively, in the event that a more accurate fit is to be performed, the process 354 proceeds to step 388 where it determines a set of points closest to the best point found in step 384. Next, a surface is fit to these points in step 390. Additionally, the intersection between the projection vector and the surface is determined to get a new projected point in step 392. Finally, the process 354 exits in step 394.

Figure 5:
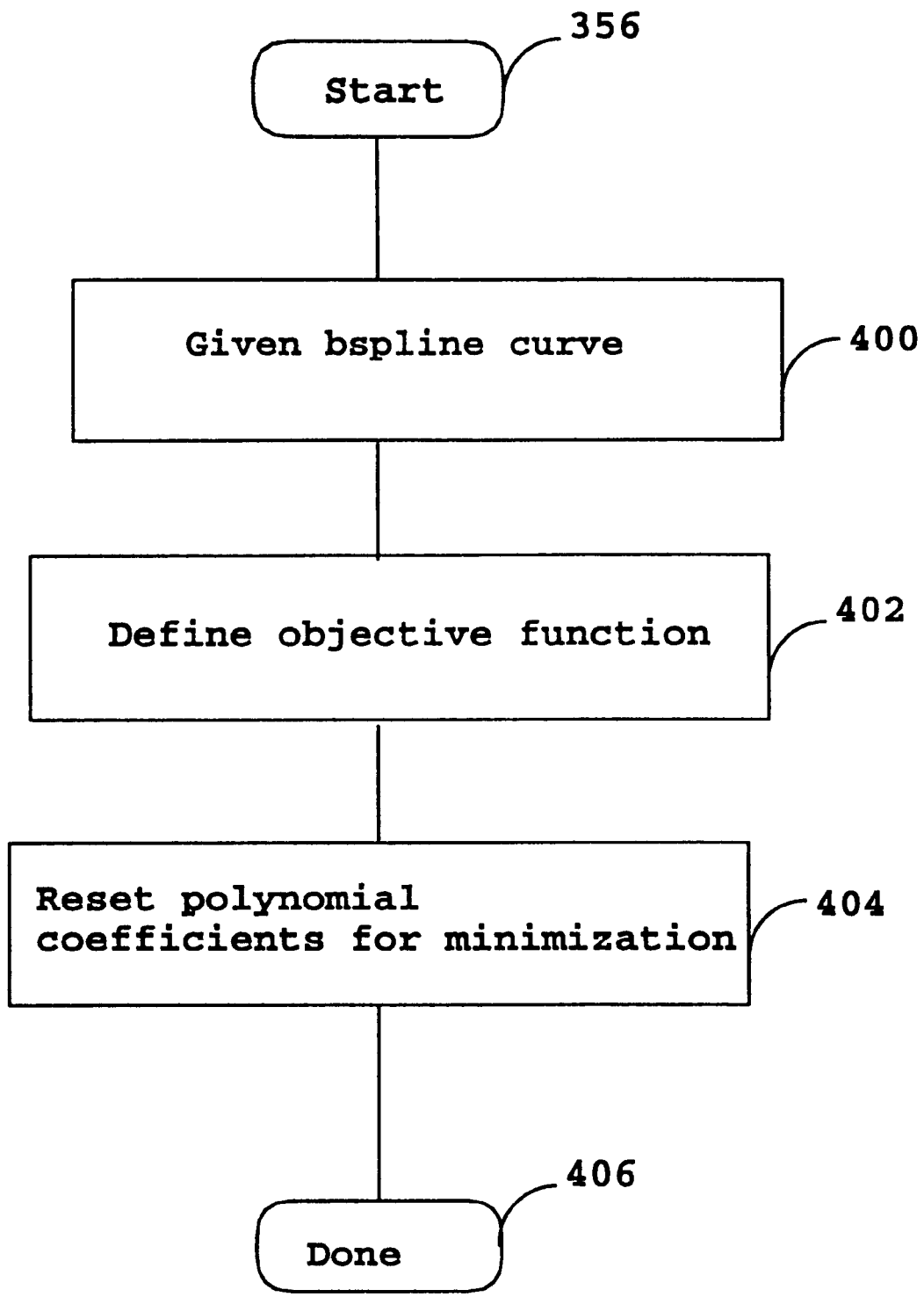
FIG. 5 is a flowchart illustrating a process for performing, based on spans, a least squares curve fit to a set of cloud points.

Referring now to FIG. 5, a process associated with step 356 of FIG. 3 to fit curves to a cloud of points based on span data is shown. Upon entry to the process 356, a B-spline curve is determined in step 400. The B-Spline curve may be determined as a function of a degree m, number of spans n, and "knots sequence" defined as $t_{(-m+1)}, \ldots, t_0, \ldots, t_n, \ldots,$ and $t_{(n+m-1)}$. A set of polynomial basis functions $b_i$ (t), I=0, ..., n+m−1 is generated which defines the B-Spline bs(t) on the interval $[t_0, t_n]$ by:

$$bs(t) = \Sigma P_i * b_i(t)$$

where each $P_i$ is a B-Spline coefficient.

Next, an objective function is defined in step 402. Points projected from bs(t) to the cloud include a projection of $bs(t_0)$ to S; a projection of $bs(t_n)$ to E; and a projection of a sample of points $bs(s_i)$, $C_i$, I=0,1, ... where $t_0 < s_i < t_n$.

Finally, the polynomial coefficients for minimizing differences between the curve and a point cloud are refined in step 404. In this step, the coefficients $P_i$ are redefined to minimize the function $$F = \Sigma \|bs(s_i) - C_i\|^2 + ST$$

subject to the interpolation conditions $$bs(t_0) = S \text{ and } bs(t_n) = E.$$

Figure 6:
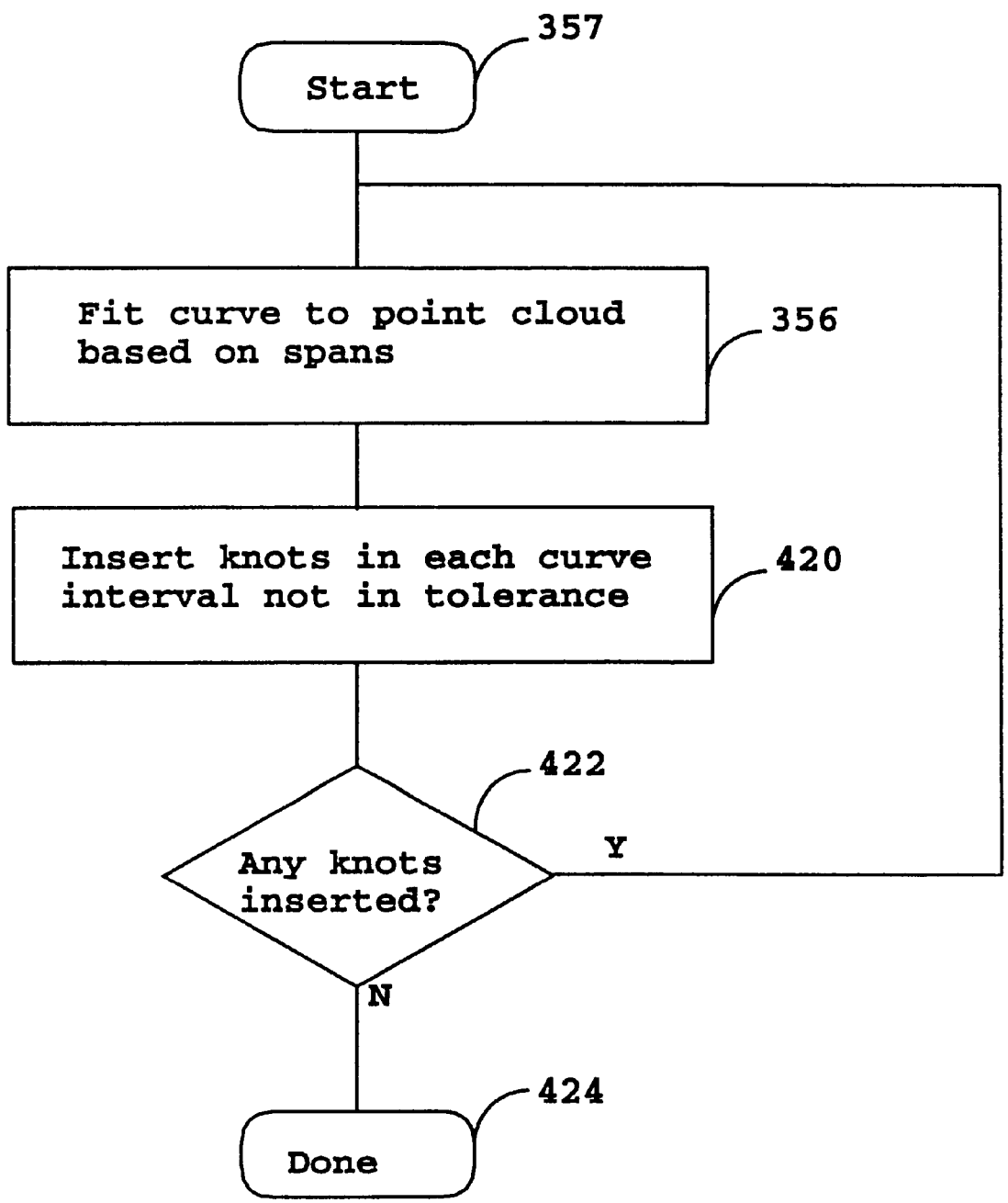
FIG. 6 is a flowchart illustrating a process for performing, based on tolerance, a least squares curve fit to a set of cloud points.

Turning now to FIG. 6, a process 357 to fit curve to point cloud based on tolerance information is shown. Upon entry to the process of FIG. 6, the curve is fit to the point cloud based on spans, as performed by step 356 of FIG. 5, with a tolerance value which is positive. Next, knots are inserted into each curve interval that is not in the specified tolerance range in step 420. In this step, for each interval $[t_i, t_{i+1}]$, if there is an $s_j$ in the interval with $\|bs(s_j) - C_j\|$>tolerance value, a knot of value $0.5*(t_i + t_{i+1})$ is inserted into the knot sequence for bs.

In step 422, the process of FIG. 6 determines if any knots were inserted in step 420. If so, the process of FIG. 6 looks back to step 356 to continue fitting the curve to the point cloud. Alternatively, the process of FIG. 6 exits in step 424.

Figure 7:
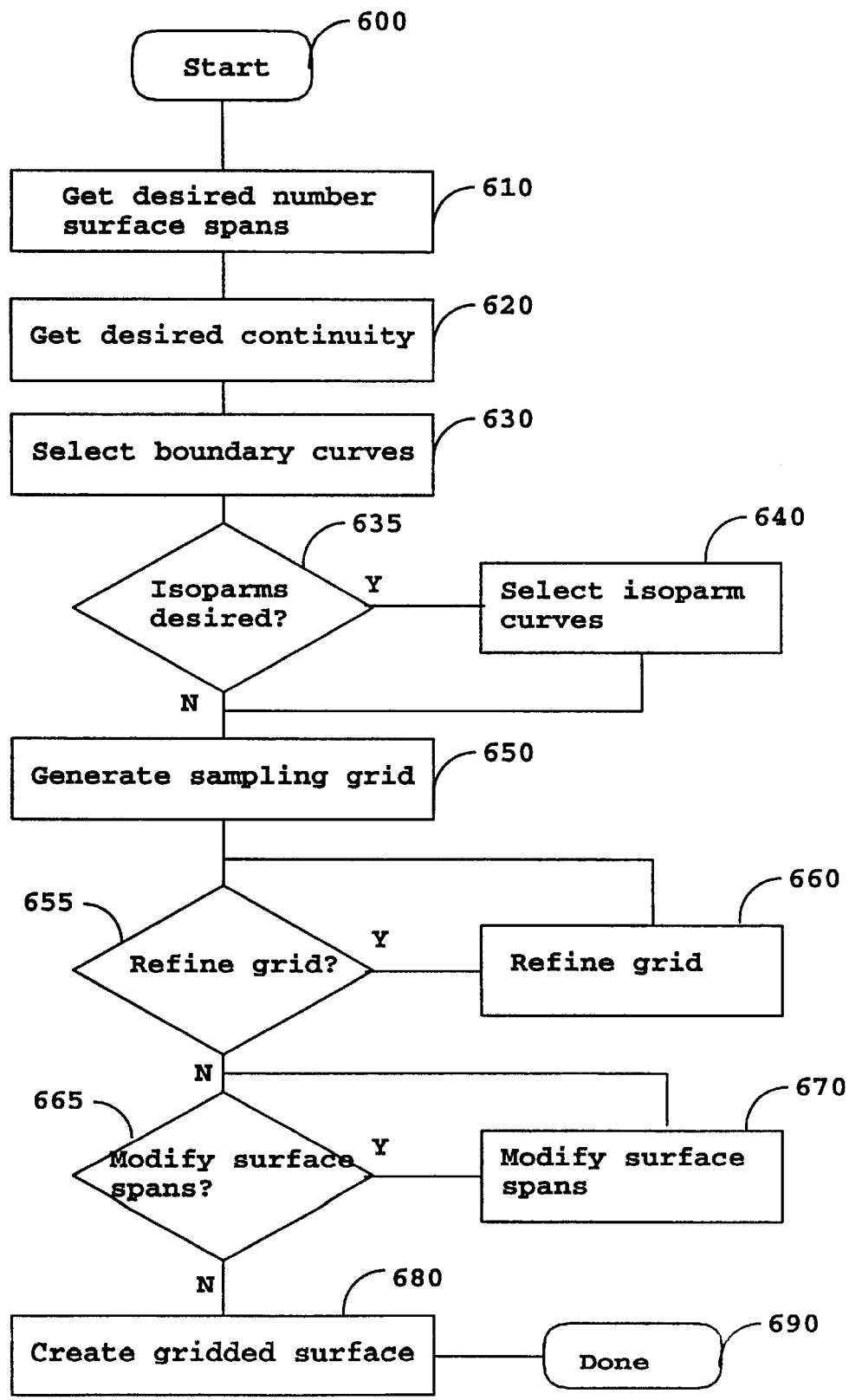
FIG. 7 is a flowchart illustrating a process for fitting gridded surfaces to the cloud points.
Figure 8:
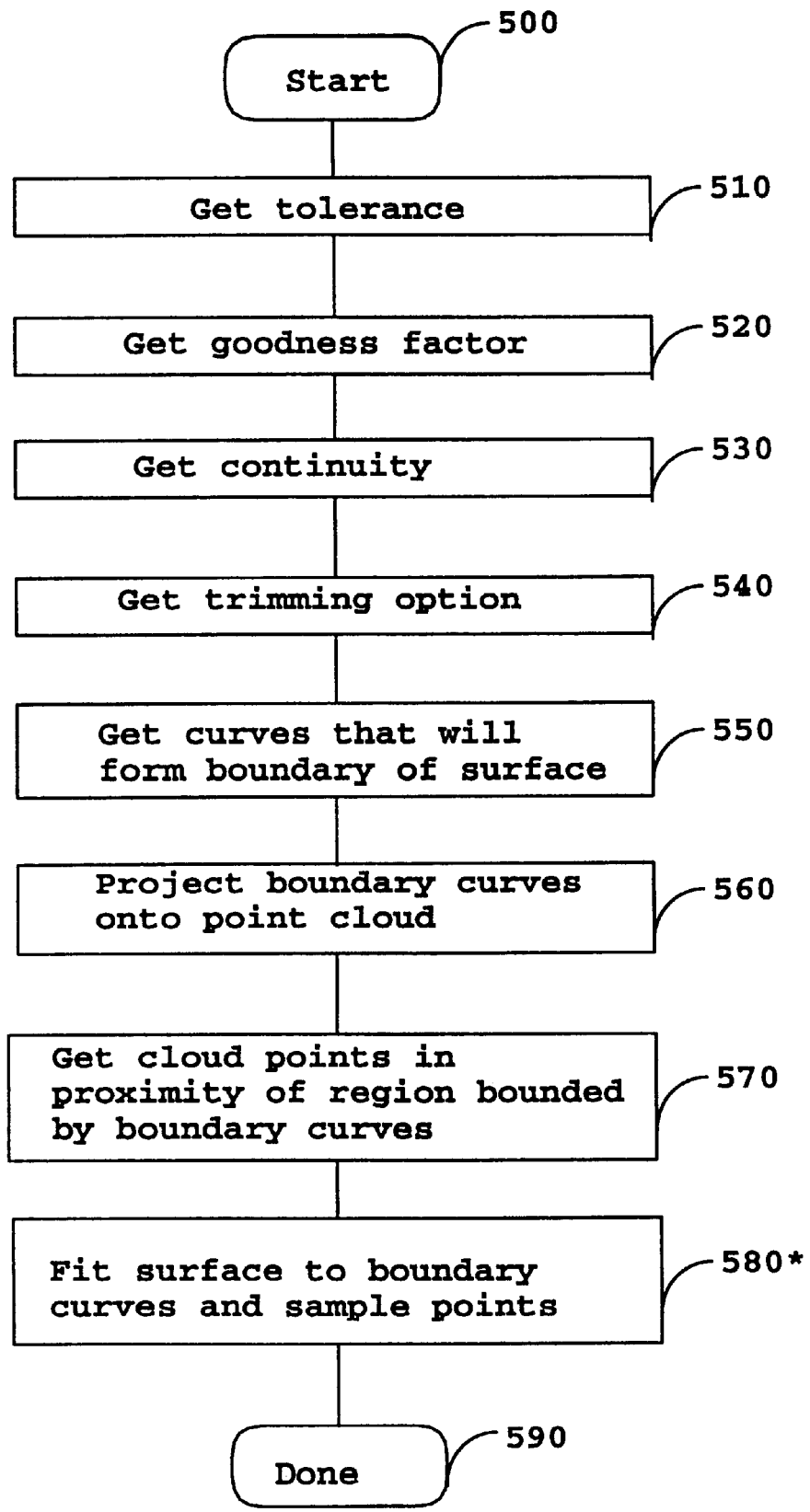
FIG. 8 is a flowchart illustrating a process for fitting detailed surfaces to the cloud points.
Figure 9:
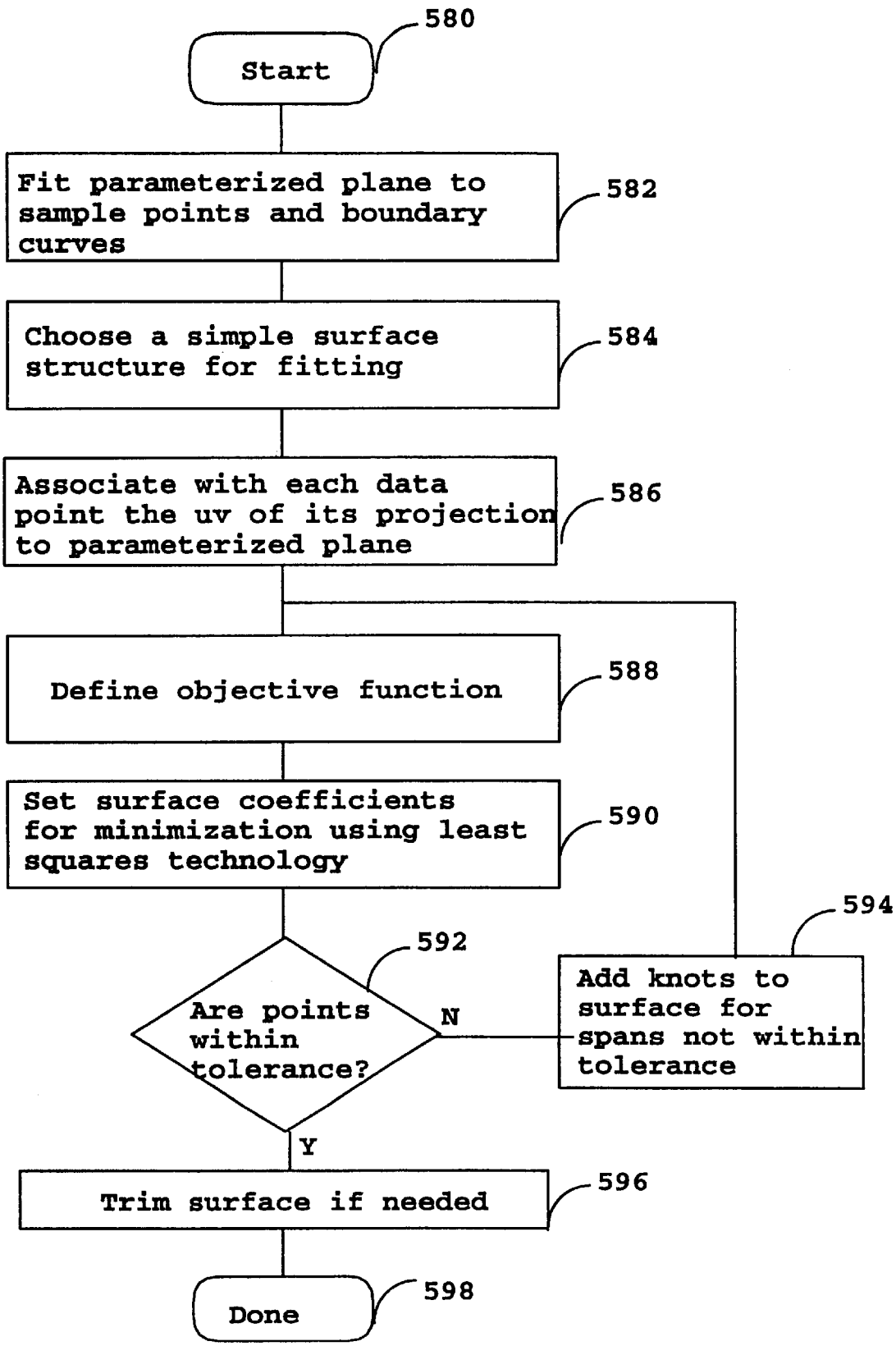
FIG. 9 is a flowchart illustrating a process for fitting a surface to boundary curves and sample points.

FIGS. 7–9 discuss in more detail a constrained least squares minimization process used to fit curves and surfaces to the cloud points. The constrained least square minimization calculation fits the cloud of points to the curves and surfaces. The constrained least squares minimization calculation can be described as solving a system of linear equations derived from the minimization problem:

$$\text{minimize} \Sigma w_i (L_i(x) - d_i)^2$$

subject to $$H_j(x) = b_j \; j = 1, 2, 3 \ldots$$

for the value of x, where x is a vector, the $w_i$ are weights, the $d_i$ and $b_j$ are constants (which can be linear combinations of constants and "symbolic" variables), and $L_i(x)$ and $H_j(x)$ are linear combinations of the components of x. A "soft constraint" refers to one of the terms $(L_i(x)-d_i)^2$ in the sum to be minimized. A "hard constraint" refers to one of the equations $H_j(x)=b_j$. These constraints typically specify the position and first and second order derivatives of the surface. Tangency between adjacent surfaces can be enforced at points by specifying first order derivative constraints for adjacent surfaces. Any variety of orders of derivatives can be chosen for setting further constraints on each surface.

For NURBS curves and surfaces, all of these constraints can be expressed in terms of their control points. The result is a system of linear equations involving the control vertices, which are variables in the curve or surface generation process. The system is then solved by least squares methods.

Referring to FIG. 7, step 600 of FIG. 1 is illustrated in more detail. First, the process 600 gets the desired number of surface spans in step 610. Next, the desired continuity between the surface to be created and any neighboring surfaces is obtained in step 620. Continuity options include: project boundary curves to cloud, hold position, or hold position and tangent. Next, in step 630, the curves that will form the boundary of the surface being created are selected.

In step 635, the process 600 determines if any isoparametric curves are to be selected. If so, the process 600 continues with step 640, which selects any number of isoparm curves, and continues on to step 650. Alternatively, if no isoparm curves are selected, the process 600 continues with step 650. Next, step 650 generates a sampling grid to be used in the surface creation.

The process to create a gridded surface applies a predetermined projection function to a point P in space and generates a point Proj(P) which is "in" the cloud. The predetermined function should be an estimate of the closest point on the surface represented by the cloud. The curves selected in step 630 and optionally in step 640 form a grid of curves defined in space. Step 650 then wraps this grid onto the surface represented by the cloud points and fills the interior of this mesh to a desired resolution.

The process of generating a mesh in the cloud from the curve grid depends on a process of "wrapping" lists of points onto the cloud. The wrapping process starts with a list of $2^n+1$ points $A_{13}0, \ldots, A_{13}(2^n)$ together with two more points $Aw\_0$ and $Aw_{13}(2^n)$. The process then generates the points $Aw\_1, \ldots, Aw\_(2^n-1)$ as follows:

(1) if n=1, only one point $Aw\_1$ needs to be generated. $Aw\_1$ is defined as $Proj(A\_1+0.5*(Aw\_0 + Aw\_2 - A\_0 - A\_2))$.

(2) if n>1, the above process is applied to $A\_0, A\_(2^{n-1})$, $A\_(2^n)$ with $Aw\_0$ and $Aw\_(2^n)$ to generate $Aw\_(2^{n-1})$. The process is then repeated recursively on $A\_0, \ldots, A\_(2^{n-1})$ with $Aw\_0$ & $Aw\_(2^{n-1})$, on $A\_(2^{n-1}), \ldots, A\_(2^n)$ with $Aw\_(2^{n-1})$ & $Aw\_(2^n)$, to generate all of the points $Aw\_1, \ldots, Aw\_(2^n-1)$.

The result are points $A\_0, \ldots, A\_(2^n)$ which have been "wrapped" onto the points $Aw\_0, \ldots, Aw\_(2^n)$. For the case where n=1, the point $M=A\_1+0.5*(Aw\_0+Aw\_2-A\_0-A\_2)$ has the same relative position to the mid point of $Aw\_0$ and $Aw\_2$ as $A\_1$ is a mid point of $A\_0$ and $A\_2$. However, since M is expected to be closer to the cloud (and the vicinity of $Aw\_0$ and $Aw\_2$) than $A\_1$, M tends to project more evenly between $Aw\_0$ and $Aw\_2$ than $A\_1$ would.

The grid of curves is sampled with a per-cell mesh edge resolution of $2^n+1$, where each cell in the grid is bounded by four edge curves, two of which are opposing curves with parameters u and v and with end points on the grid intersection points.

Each cell sample is wrapped to the cloud by first projecting its corners using Proj( ). Each cell edge sample is then wrapped to the cloud. This generates the boundary of a $(2^n+1) \times (2^n+1)$ mesh in the cloud from which interior points are generated. In one embodiment, the interior points are generated as follows. Using a discrete boolean sum evaluation on the wrapped boundary points, $(2^{n-1}+1)$ mid parameter mesh points are estimated in each parameter direction. A common midpoint is projected using Proj( ). Next, the remaining estimated points are wrapped to the surface. This process applies the wrap process four times, each on $2^{n-1}+1$ points, to produce four new sub cells with half the original resolution. The process is recursively performed until a complete $(2^n+1) \times (2^n+1)$ mesh has been wrapped to the cloud. This wrapping procedure can be made to work for the grid or mesh resolutions of size $(2^n+1) \times (2^m+1)$ for unequal m and n by stopping the recursion when the smaller edge sample size reaches 1. The mesh, at resolution value m (which is not of the form $2^n+1$), is found by: (1) generate the mesh of resolution $2^n+1$, where $2^n+1>m$; (2) derive an estimate of the coarser mesh from this mesh, and optionally, (3) re-project each point of the mesh via Proj( ). Upon completing the process 600, a union of the mesh points of all of the cells creates a larger mesh which can then be used to fit a bspline surface patch using standard least squares techniques.

In step 655, the process 600 determines if the sampling grid is to be refined. If so, the process 600 continues on to step 660 which performs a refinement of the sampling grid and then loops back to step 655. Alternatively, if no refinements are needed, the process 600 continues to step 665, where the process 600 determines if the number of surface spans should be modified. If so, step 670 is performed which modifies the number of surface spans and the process loops back to step 665. Alternatively, step 665 continues on to step 680. In step 680, a bspline surface patch is created using a standard least square technique. Finally, the process 600 exits in step 690.

Turning now to FIG. 8, step 500 of FIG. 1 is illustrated in more detail. First, the process of step 500 obtains a tolerance range from the user or from a predetermined value in step 510. This is used to fit the surface to the point cloud within this tolerance. Next, a goodness factor for the fit is obtained in step 520. This factor determines the percentage of points that must fit the surface within the tolerance obtained in step 510. Next, a continuity is obtained in step 530. This continuity is used to determine the continuity between the surface being created and any neighboring surfaces. Continuity may be positional, tangent, or curvature continuity. Next, step 540 obtains the trimming option. This option determines whether or not a trimmed surface is created. Next, in step 550, the curves that will form the boundary of the surface being created are selected. Next, in step 560, these curves are projected onto the point cloud using process 350 described further in FIG. 3. In step 570, the cloud points in the proximity of the region bounded by the boundary curves are determined. Next, in step 580, a least squares fit of a surface to the boundary curves and points $\{P_i\}$ is performed. The surface fitting process is shown in more detail in FIG. 9. The process of FIG. 8 then exits in step 590.

Referring now to FIG. 9, a process to fit surface to boundary curves and sample points 580 is shown. In FIG. 9, a parameterized plane is fit to sample points and boundary curves in step 582. The plane is expressed as a bilinear tensor product B-Spline surface. This establishes a parameterization for the plane. The domain is chosen to be slightly larger than necessary for the sample points to project onto the active part of this B-Spline surface. This surface will be referred to as the parameter surface ps(u,v).

Next, a simple bspline surface structure S for the to-be-determined surface S is selected for fitting the boundary curves in step 584. It is chosen to have the same domain as ps. Only the values of the control points are determined in step 586. A sample of points {B$_j$} is projected from the curves together with the points {P$_i$} onto the parameter surface ps to obtain parameters of the projected points {uv$_j$} and {uv$_i$}.

From step 586, an objective function is defined in step 588. Treating the coefficients of S(u,v) as free variables, the objective function F is defined by $$F = a * \sum (\|S(uv_j) - B_j\|^2) +$$
$$b * \sum (\|S(uv_i) - P_i\|^2) +$$
$$c * ST$$

where a, b, c are relative weights assigned to curve fitting, point fitting, and smoothing respectively. ST is a smoothing term which is of the form $\Sigma(\|$linear combination of derivatives of S$\|^2)$.

The coefficients of the surface S(u,v) are redefined so as to minimize the function F, subject to S interpolating a selection of the sample points such as the start and end points of the curves. Since the terms S(uv$_j$)–B$_j$, S(uv$_i$)–P$_i$, the inner terms of the expression for ST, and the interpolation conditions are all linear, the above minimization may be found by classical least squares techniques.

Next, surface coefficients for minimization are set using the least squares-fitting process in step 590. Next, the resulting points are checked to see if they are within a predetermined tolerance in step 592. If not, the process of FIG. 9 proceeds to step 594 which adds knots to the surface for spans not within the predetermined tolerance. From step 594, the process of FIG. 9 loops back to 588 to continue the fitting process. Alternatively, if all points are within the predetermined tolerance in step 592, the process in FIG. 9 proceeds to step 596 where it trims the surface if needed. Next the process of FIG. 9 exits in 598.

The cloud of points modeling methods may be implemented in hardware or software, or a combination of both. Preferably the invention is implemented in one or more computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

Referring to FIG. 10, a computer system 200 for generating curves or surfaces from a cloud of points includes a CPU 202, a display 204, a system memory 206, an internal memory device (e.g., hard disk drive) 208, a user input device(s) 210 (e.g., keyboard and mouse), and a removable storage medium 212 (e.g., floppy, tape, or CD-ROM) read by an appropriate drive 214, all coupled by one or more bus lines 216. A cloud of points surface generator program can be stored on a suitable removable storage medium 212, and then introduced to computer system 200 through drive 214 to be either temporarily stored in system memory 206 or permanently stored in internal memory device 208. CPU 202 then uses the introduced cloud of points surface generator program to generate one or more curves or surfaces.

Other embodiments are within the scope of the claims.

What is claimed is:

1. A computer-implemented method of producing a model of an object, comprising:
    scanning the object to produce three-dimensional digitized position data associated with the object as a cloud of points and storing the data;
    projecting curves onto the point cloud based upon determining span data and a predetermined tolerance range, wherein a knot is inserted into each curve interval that is outside the predetermined tolerance range; and
    fitting a surface onto the point cloud by generating a grid of curves and wrapping the grid onto the surface represented by the cloud points.

2. The method of claim 1, further comprising projecting a curve onto the cloud to closely approximate an original curve of the target.

3. The method of claim 2, wherein projecting of the curve further comprises determining a direction of the projection.

4. The method of claim 3, wherein the direction determination is user-specified.

5. The method of claim 3, wherein the direction determination is performed using a projection vector.

6. The method of claim 2 further comprising fitting the projected curve to a predetermined number of spans of the original curve.

7. The method of claim 2, further comprising fitting the projected curve to a user-specified criterion.

8. The method of claim 7, further comprising iteratively modifying the user-specified criterion.

9. The method of claim 1, further comprising sampling the original curve.

10. The method of claim 1, wherein the projected curve is fit to the original curve using a b-spline parameterized curve.

11. A system for producing models of curves and surfaces of an object, comprising:
    a processor;
    a display coupled to the processor; and
    a computer readable medium coupled to the processor, the medium having:
        code implementing storage of three-dimensional digitized position data associated with the object as a cloud of points;
        code implementing projection of curves onto the point cloud based upon determining span data and a predetermined tolerance range, wherein a knot is inserted into each curve interval that is outside the predetermined tolerance range and;
        code implementing fitting of a surface onto the point cloud by generating a grid of curves and wrapping the grid onto the surface represented by the cloud points.

12. The system of claim 11, further comprising code for projecting a curve onto the cloud to approximate an original curve on the object.

13. The system of claim 12, wherein the code for projecting the curve further comprises code for determining a direction of the projection.

14. The system of claim 13, wherein the direction determining code enables receipt of a user-specified direction.

15. The system of claim 13, wherein the direction determining code is performed using a projection vector.

16. The system of claim 12, further comprising code for fitting the projected curve to a predetermined number of spans on the original curve.

17. The system of claim 12, further comprising code for fitting the projected curve to a user-specified criterion.

18. The system of claim 17, further comprising code for iteratively modifying the user-specified criterion.

19. The system of claim 11, wherein the projected curve is fit to the original curve using a b-spline parameterized curve.

20. An interface method for use with a computer-based curve and surface modeling of an object, the method comprising:

storing in a computer memory digitized position data for a three-dimensional cloud of points associated with the target;

projecting curves onto the point cloud based upon determining span data and a predetermined tolerance range, wherein a knot is inserted into each curve interval that is outside the predetermined tolerance range;

fitting a surface onto the point cloud by generating a grid of curves and wrapping the grid onto the surface represented by the cloud points;

enabling a user to interactively alter one or more parameters; and automatically refitting the one or more curves or surfaces to the cloud of points in response to the user's altered parameters.

21. A method of modeling an object, comprising;

determining three dimensional positions on a surface of the object obtaining a cloud of points corresponding to the positions;

determining span data and a tolerance range;

projecting a grid onto the cloud of points and creating grid projection points corresponding to a surface of the object using cloud points associated with each projection;

adding knots to the surface for spans outside the tolerance range; and fitting one or more curves or surfaces to the grid projection points.

22. A method as recited in claim 21, wherein the projecting comprises:

determining a normal for each projection;

determining a subset of cloud points in proximity to the projection normal defining a hypothetical surface; and determining an intersection of the projection normal with the hypothetical surface as the grid projection point.

23. A method of modeling an object, comprising;

determining three dimensional positions on a surface of the object obtaining a cloud of points corresponding to the positions, and determining span data and a tolerance range;

specifying desired surface characteristics of a model of the object;

producing polygonal curves representing boundaries of a surface of the object;

inserting knots in the curves for spans outside the tolerance range;

generating a sampling mesh of three dimensional coordinate points within the boundaries by projecting onto the cloud; and fitting a surface to the three-dimensional coordinates points using least squares fitting and the desired surface characteristics.

24. A method as recited in claim 23, wherein the desired surface characteristics include a number of surface spans, continuity with neighboring surfaces and a specification of isoparm curves.

25. A method as recited in claim 23, wherein the generating comprises recursively increasing a resolution of the mesh.

26. A method as recited in claim 23, wherein a first iteration of the sampling mesh is generated by sampling the boundary curves, first at the endpoints followed by interior points, and projecting these points onto the cloud of points.

27. A method as recited in claim 23, wherein the generating includes interior sampling mesh points produced by generating mesh cell mid-edge points and generating cell midpoints using a discrete boolean sum evaluation and projection.

28. A method as recited in claim 23, wherein in the generating a projection function maps each sampling mesh point to a three-dimensional coordinate location that would theoretically lie on the object where the projection function:

estimates a normal for each mesh grid point;

determines a subset of cloud of points in proximity of a ray emanating from the mesh point in a direction of the normal; and estimates a intersection of the ray with a hypothetical surface in a vicinity of the subset.

29. A method as recited in claim 23, wherein the producing comprises:

determining a number of points in each parametric surface direction required to obtain the desired surface characteristic;

projecting curve endpoints onto the hypothetical surface; and recursively projecting curve midpoints responsive to the projected endpoints.

30. A method of modeling an object, comprising;

determining three dimensional positions on a surface of the object obtaining a cloud of points corresponding to the positions, and determining a tolerance range;

specifying desired surface characteristics of a model of the object where the desired surface characteristics include a number of surface spans, continuity with neighboring surfaces and a specification of isoparm curves;

producing polygonal curves representing boundaries of a surface of the object, the producing comprising:

determining a number of points in each parametric surface direction required to obtain the desired surface characteristic;

projecting curve endpoints onto the hypothetical surface, recursively projecting curve midpoints responsive to the projected endpoints, and inserting knots into each curve interval that is outside the tolerance range;

generating a sampling mesh of three dimensional coordinate points within the boundaries by projecting onto the cloud, the generating comprising:

recursively increasing a resolution of the mesh, and using a projection function to map each sampling mesh point to a three-dimensional coordinate location that would theoretically lie on the object where the projection function determined by:

estimating a normal for each mesh grid point, determining a subset of cloud of points in the proximity of a ray emanating from the mesh point in a direction of the normal, and estimating an intersection of the ray with a hypothetical surface in the vicinity of the subset; and fitting a surface to the three-dimensional coordinates points using least squares fitting and the desired surface characteristics.

\* \* \* \* \*

UNITED STATES PATENT AND TRADEMARK OFFICE
CERTIFICATE OF CORRECTION

PATENT NO. : 6,253,164 B1
DATED : June 26, 2001
INVENTOR(S) : Nikki Ruth Rohm

It is certified that error appears in the above-identified patent and that said Letters Patent is hereby corrected as shown below:

<u>Column 5,</u>
Line 42, change "$A_{13}0$" to -- $A\_0$ -- and "$A_{13}(2^n)$" to -- $A\_(2^n)$ --.
Line 43, change "$Aw_{13}(2^n)$" to -- $Aw\_(2^n)$ --.

Signed and Sealed this

Twenty-sixth Day of February, 2002

Attest:

JAMES E. ROGAN
*Attesting Officer*   *Director of the United States Patent and Trademark Office*